United States Patent
Wassenhoven et al.

[11] Patent Number: 5,987,870
[45] Date of Patent: Nov. 23, 1999

[54] OPEN-END SPINNING DEVICE

[75] Inventors: Heinz-Georg Wassenhoven; Claus-Dieter Landolt; Jochen Dressen, all of Moenchengladbach, Germany

[73] Assignee: W. Schlafhorst AG & Co., Moenchengladbach, Germany

[21] Appl. No.: 09/065,777

[22] Filed: Apr. 24, 1998

[30] Foreign Application Priority Data

Apr. 26, 1997 [DE] Germany ............... 197 17 735

[51] Int. Cl.⁶ ................................................ D01H 4/00
[52] U.S. Cl. ................................ 57/406; 57/404; 57/407; 57/408; 57/417
[58] Field of Search ............................. 57/400, 404, 406, 57/407, 408, 415, 417

[56] References Cited

U.S. PATENT DOCUMENTS

| | | | |
|---|---|---|---|
| 5,280,700 | 1/1994 | Haase et al. | 57/406 |
| 5,638,671 | 6/1997 | Stahlecker et al. | 57/417 |
| 5,778,654 | 7/1998 | Stahlecker | 57/407 |
| 5,794,430 | 8/1998 | Grecksch et al. | 57/407 |

FOREIGN PATENT DOCUMENTS

| | | |
|---|---|---|
| 43 34 485 A1 | 4/1995 | Germany . |
| 295 07 654 U1 | 10/1996 | Germany . |
| 195 24 837 A1 | 1/1997 | Germany . |

Primary Examiner—William Stryjewski
Attorney, Agent, or Firm—Kennedy Covington Lobdell & Hickman, LLP

[57] ABSTRACT

An open-end spinning device comprises a spinning rotor rotating in a vacuum-loaded rotor housing which can be closed by a conduit plate having a receptacle receiving a replaceable conduit-plate adapter and a locking device, e.g., a bar spring, for spring-biasing the conduit-plate adapter into the receptacle. A blocking device comprising a hood-like cover is associated with the locking device for movement into an operating position only when the locking device is positioned in a locking position in which it reliably fixes the conduit-plate adapter.

7 Claims, 6 Drawing Sheets

OPEN-END SPINNING DEVICE

BACKGROUND OF THE INVENTION

The present invention relates generally to an open-end spinning device.

Such open-end spinning devices are known e.g. from German Patent Publication DE 195 24 837 A1. Such spinning devices basically have a rotor housing in which a spinning rotor rotates at a high speed. This rotor housing, which is open to the front, is closed in an airtight manner during the spinning process by a conduit plate. The conduit plate is a component of a pivot housing, and more specifically, the conduit plate is either screwed onto the pivot housing or is already permanently integrated into the pivot housing.

Moreover, a sliver-opening device is arranged in the pivot housing and includes, among other things, a driven sliver drawing-in cylinder and a driven opening cylinder. The arrangement of these driven, rotating structural elements is such that they are automatically taken out of operation or braked when the spinning device is opened, that is, when the pivot housing is swung away from the rotor housing. During the spinning operation when the pivot housing is pivoted into engagement with the rotor housing, the conduit plate rests with an annular lip seal on the rotor housing and closes the latter in an airtight manner.

A replaceable conduit-plate adapter is arranged in a central recess of the conduit plate. The conduit-plate adapter, on the one hand, forms the mouth area of the fiber guide conduit and, on the other hand, fixes a centrally arranged yarn withdrawal nozzle. The conduit-plate adapter is mounted with a conically designed shoulder body in a correspondingly designed receptacle of the conduit plate and is fixed via suitable fastening device which load the conduit-plate adapter with a force component in the direction of the receptacle bottom. Moreover, the conduit-plate adapter is aligned in an angularly precise manner within its receptacle via an adjusting-pin arrangement.

According to German Patent Publication DE 195 24 837 A1 the conduit-plate adapter is fixed, for example, by a bar spring which engages in a tangential groove on the conical shoulder body. The free end of the bar spring fastened to the pivot housing extends out of the pivot housing and can be actuated by the operating personnel to release or disengage the conduit-plate adapter.

These known devices have the disadvantage that, when the pivot housing is closed, the operating personnel cannot recognize whether the conduit-plate adapter is locked, i.e., fixed in place, according to instructions. A conduit-plate adapter which is not properly locked can slide out of its receptacle during the spinning process and come in contact with the spinning rotor rotating at a high speed, which causes considerable damage to the spinning device.

SUMMARY OF THE INVENTION

The present invention accordingly has the object of providing improvements over the spinning devices of the state of the art described above and, in particular, overcoming the disadvantages thereof.

This object is achieved in accordance with the present invention by an open-end spinning device which comprises a vacuum-loaded rotor housing, a spinning rotor rotatably supported in the housing, a conduit plate for closing the housing, the conduit plate defining a receptacle, a replaceable conduit-plate adapter mounted in the receptacle, and a locking device for fixing the conduit-plate adapter within the receptacle. According to the present invention, a blocking device is associated with the locking device for movement into an operating position only when the locking device is in a locking position fixing the conduit-plate adapter.

This embodiment of a spinning device in accordance with the invention has the particular advantage that operating personnel can unambiguously recognize before the closing of the spinning device whether the conduit-plate adapter is properly secured in accordance with instructions in its receptacle. That is, the operating personnel can readily see from the position of the blocking device whether the locking device is in its locking position since the blocking device can only be pivoted into its operating position in the locking position of the locking device.

In a preferred embodiment, the locking device is designed as a spring element which can be adjusted between a release position and a locking position. The locking device is preferably designed as a bar spring which can be shifted along a connecting link. The connecting link has a stop location on each end which defines the locking position at one end and the release position for the locking device at the other end. The use of a bar spring made of spring steel as the locking device results in an economical, wear-resistant device which always assures a reliable fixing of the conduit-plate adapter in the receptacle of the conduit plate.

The conduit-plate adapter preferably has a centrally arranged shoulder on its rear side, i.e., facing away from the rotor, behind which shoulder the bar spring is engaged when the spring is positioned in its locking position. The bar spring loads the shoulder of the conduit-plate adapter in the direction of the interior of the receptacle within the conduit plate whereby the conduit-plate adapter is drawn into its receptacle and reliably fixed there under spring tension.

Since the bar spring engages this centrally arranged shoulder of the conduit-plate adapter, it is assured that the conduit-plate adapter is always uniformly placed by its preferably conical contact surface on a correspondingly designed support surface of the receptacle.

The blocking device is preferably designed as a movably supported hood-like cover with a blocking element disposed to be pivoted into the area of the release position of the locking device when the blocking device is closed. Thus, when the locking device is positioned in the release position, the hood-like cover is prevented from being able to be moved into its operating position. Since an open hood-like cover is immediately recognizable to the operating personnel, each spinning device in which the conduit-plate adapter is not secured according to instructions (and therefore start-up of the respective spinning location would result in consequent damage) is made recognizable in a simple manner.

The hood-like cover is preferably mounted so that it can rotate in a limited manner about a pivot shaft on an upper wall of the pivot housing and rests in its operating position on this upper wall. Such a pivot-shaft bearing is relatively easy to manufacture and is distinguished by a long service life.

The hood-like cover may preferably have a laterally-projecting cover flange as the blocking element. This cover flange is arranged to prevent the blocking device from being able to be closed when the bar spring is in its release position. That is, the cover flange is placed on the bar spring when the hood-like cover is closed so that, when the bar spring is in its release position, the blocking device is prevented in a simple manner from moving into its operating position, in which the blocking device rests flatly on the upper wall of the pivot housing.

Further details, features and advantages of the invention can be understood from an exemplary embodiment described in the following description with reference to the accompanying drawings.

DESCRIPTION OF THE PREFERRED EMBODIMENT

Figure 1:
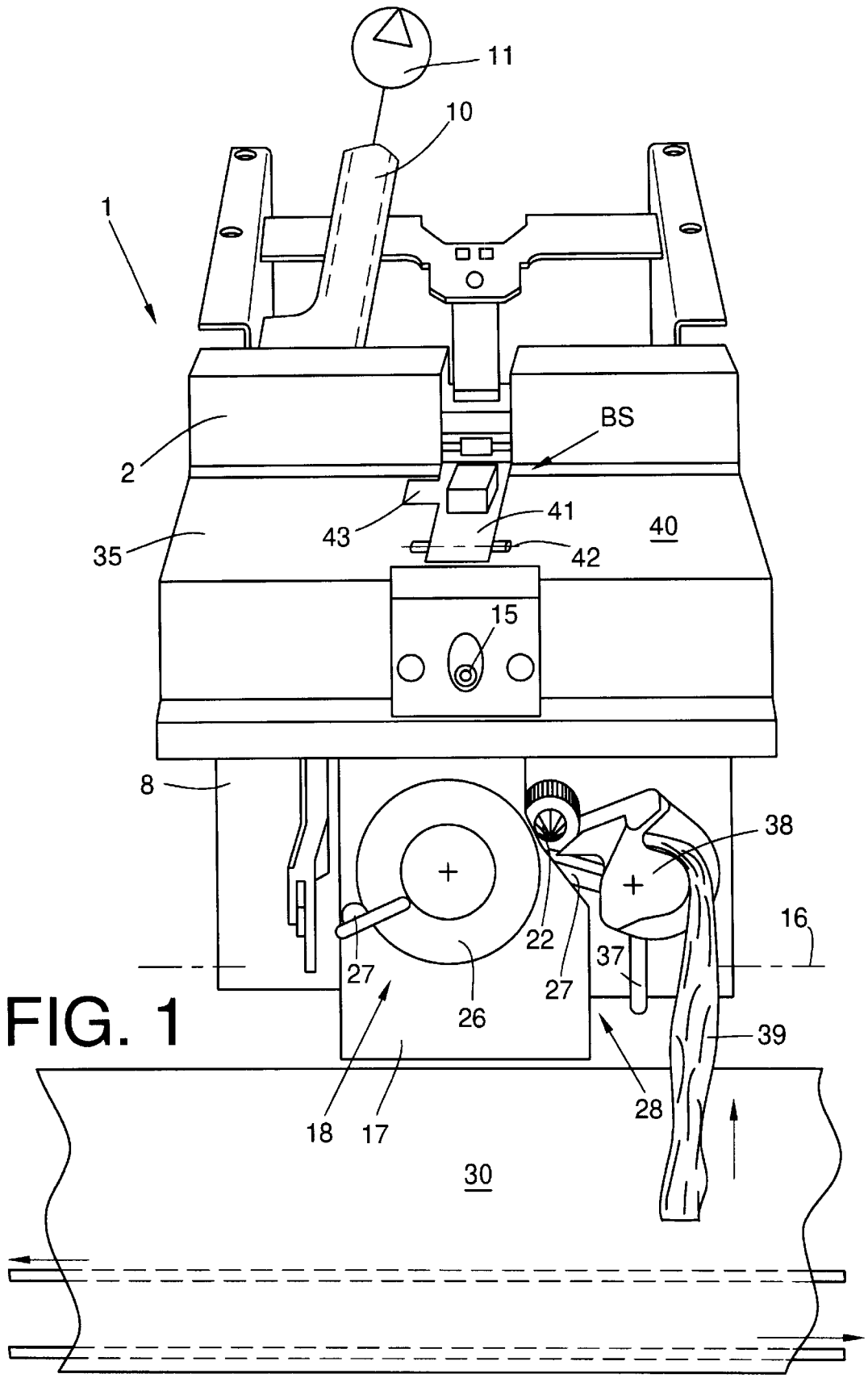
FIG. 1 is a perspective view of an open-end spinning device with a blocking device in accordance with a preferred embodiment of the present invention.
Figure 2:
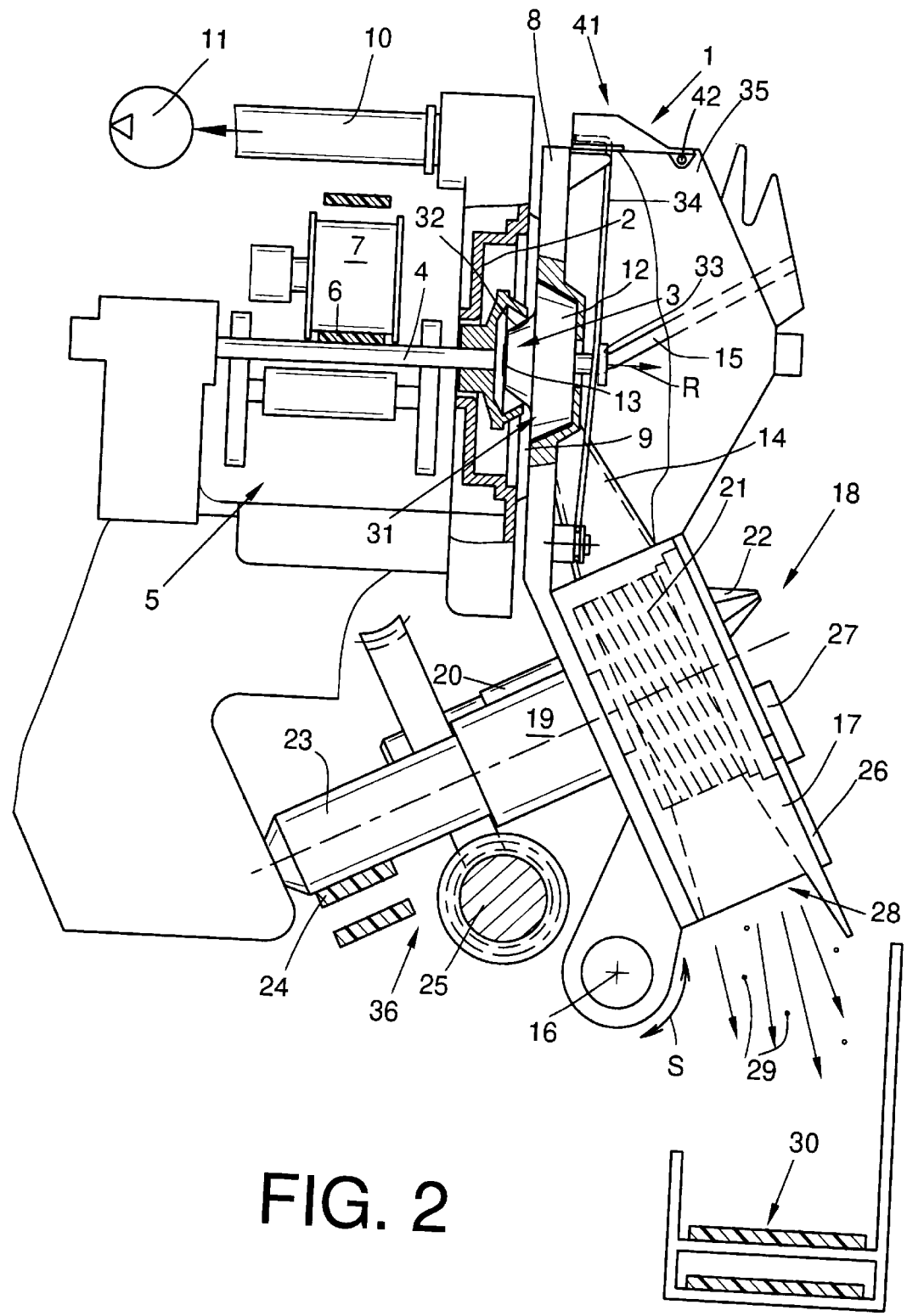
FIG. 2 is a side elevational view in partial section of the open-end spinning device of FIG. 1.
Figure 3:
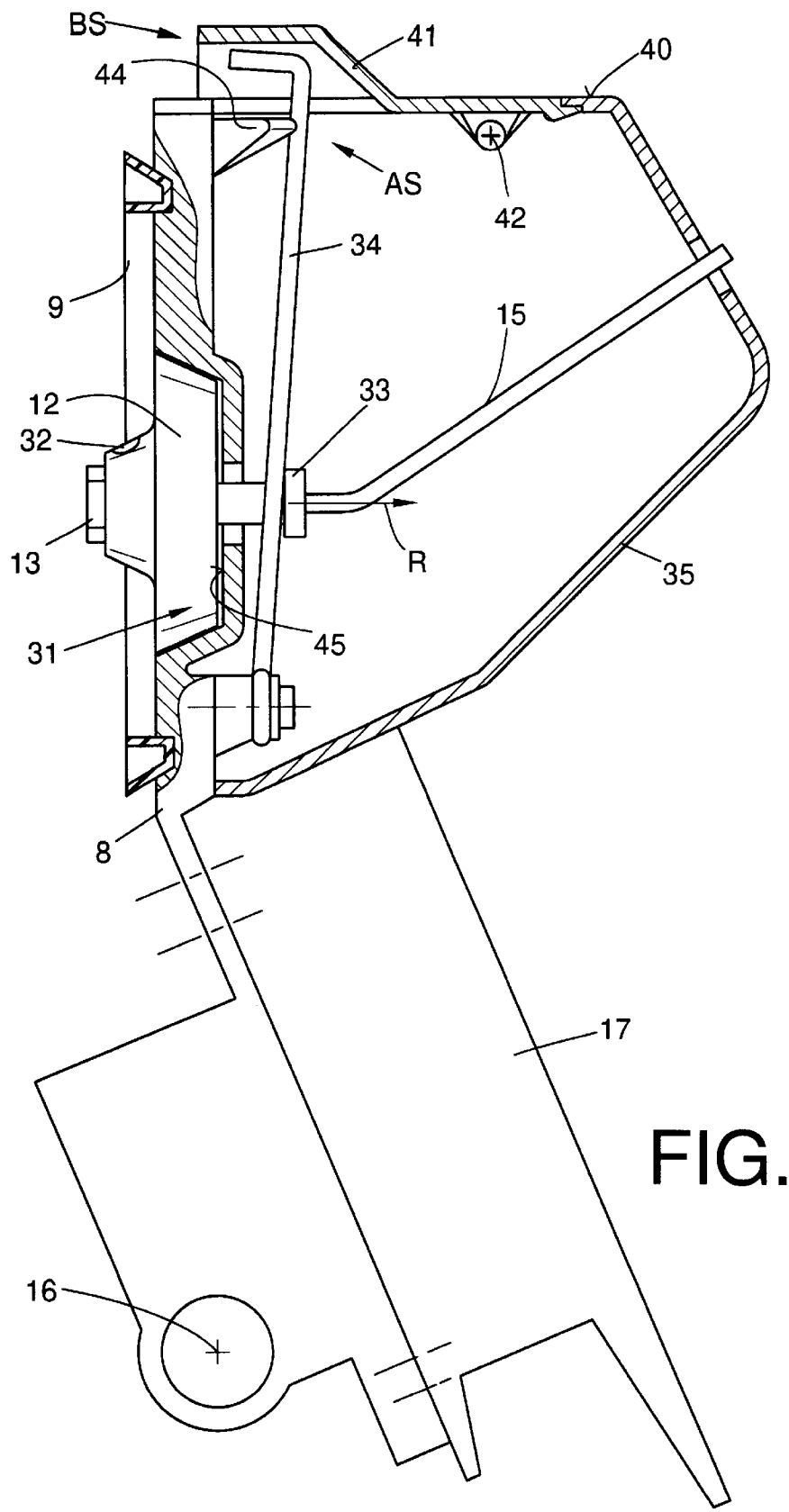
FIG. 3 is a more enlarged side elevational view of the pivot housing of the open-end spinning device with the locking device in its locking position and the blocking device positioned in its operating position.
Figure 4:
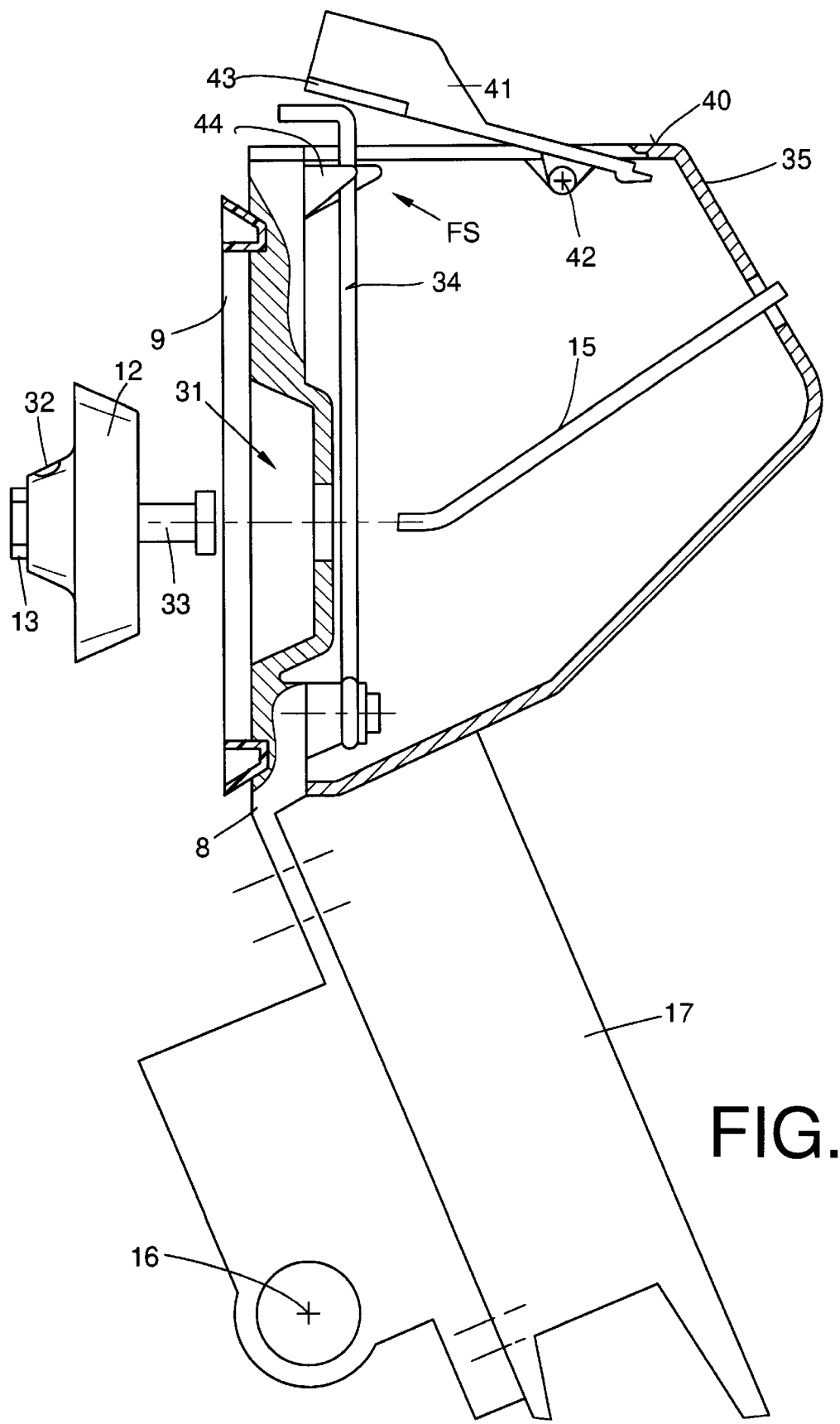
FIG. 4 is another enlarged side elevational view of the pivot housing similar to FIG. 3, showing the locking device positioned in the release position.
Figure 5:
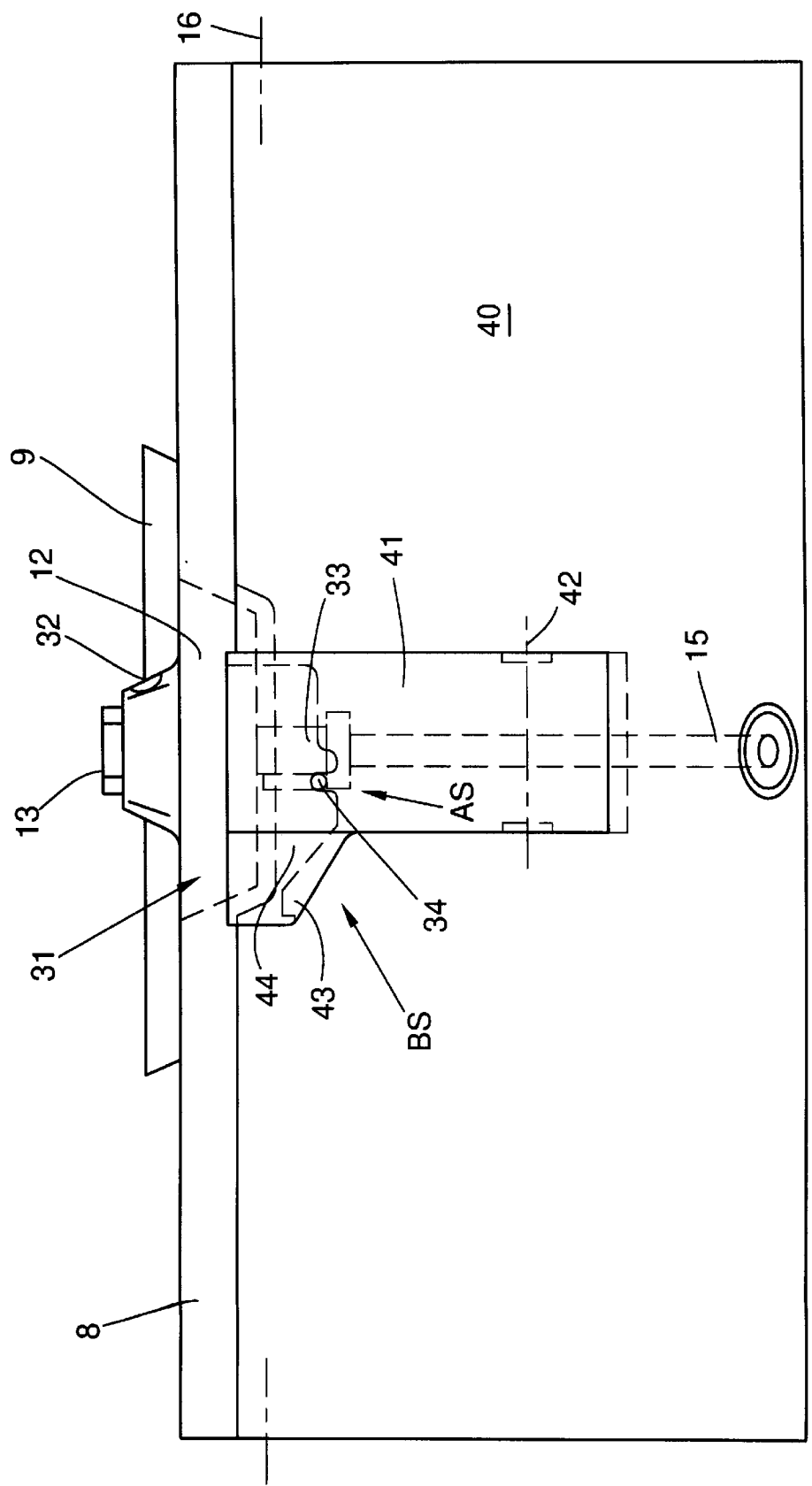
FIG. 5 is a top view of the pivot housing of FIG. 3.
Figure 6:
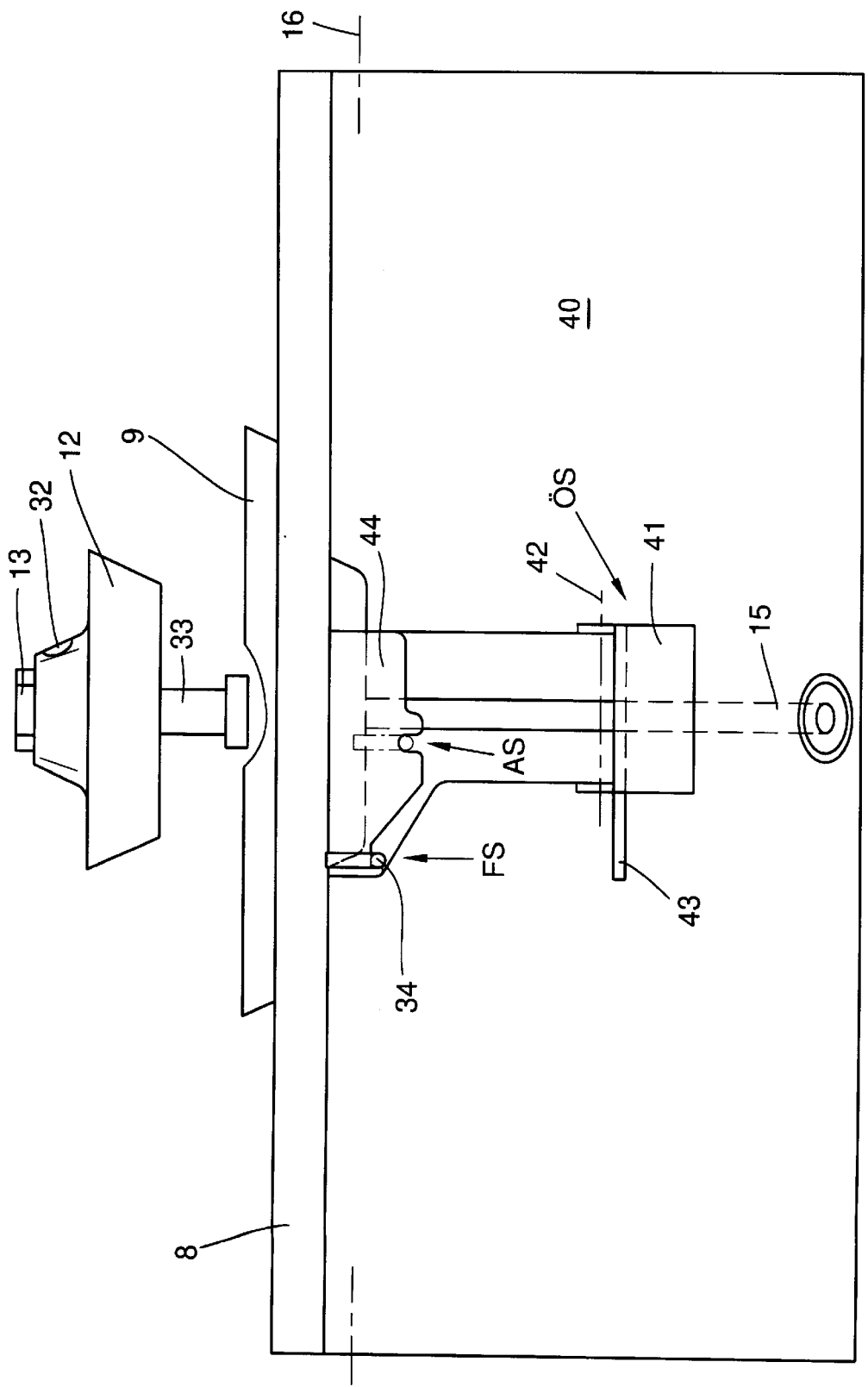
FIG. 6 is another top view of the pivot housing similar to FIG. 5 showing the blocking device in its completely open disposition.

Referring now to the accompanying drawings and initially to FIG. 1, an open-end rotor spinning device is shown and basically has a rotor housing 2 in which spinning rotor 3 rotates at a high speed. As is indicated in FIG. 2, spinning rotor 3 is mounted by its rotor shaft 4 in the nip of a conventional support disk bearing 5. The drive of spinning rotor 3 takes place, as is customary, via tangential belt 6 extending the length of the machine and held by pressure roller 7 in contact with rotor shaft 4.

Rotor housing 2 is open to its forward or front side and is closeable at such side by pivot housing 8 formed as a conduit plate and by a suitable seal 9 attached to pivot housing 8. Vacuum source 11 is connected to rotor housing 2 via appropriate pneumatic line 10, which source assures a vacuum in rotor housing 2 necessary for open-end spinning.

As is apparent in particular from FIGS. 3–6, conduit-plate adapter 12 is fixed in receptacle 31 of pivot housing 8 and comprises mouth area 32 of fiber guide conduit 14. Moreover, yarn withdrawal nozzle 13 is affixed to the front side of conduit-plate adapter 12. Conduit-plate adapter 12 comprises central shoulder 33 on its rearward side (facing away from the rotor) behind which shoulder a locking device, e.g. bar spring 34, can grasp so that the shoulder can be loaded in direction R. Yarn withdrawal tube 15 fits in central shoulder 33 of conduit-plate adapter 12, which tube can also be fastened to cover 35 of pivot housing 8.

Pivot housing 8, mounted so that it can rotate about pivot axis 16, also houses sliver opening device 18. This sliver-opening device 18 comprises, as is known, opening cylinder 21 and sliver drawing-in cylinder 22. Opening cylinder 21 rotates, as is customary, in opening-cylinder housing 17. Opening cylinder 21 and sliver drawing-in cylinder 22 are mounted in respective bearing brackets 19, 20 of pivot housing 8. Opening cylinder 21 is driven via tangential belt 24 which extends the length of the machine and loads whorl 23 of opening cylinder 21. Sliver drawing-in cylinder 22 is driven via worm-gear transmission 36 from drive shaft 25 also extending the length of the machine.

Opening-roller housing 17 of sliver opening device 18 has dirt exit opening 28 through which dirt particles 29, released during the opening separation of sliver 39 into individual fibers, can be discharged, e.g. into mechanically operating dirt removal device 30. Opening roller 21 rotating in opening-roller housing 17 can be covered by safety disk 26 fixed by bolt 27.

As shown in FIG. 1, feed trough 37 is arranged in the area of sliver drawing-in cylinder 22. Sliver infeed funnel 38 is fixed on feed trough 37. Sliver 39, which is stored in a sliver can (not shown), is bundled in this sliver infeed funnel 38 before it is presented to the opening roller and separated by the latter into individual fibers.

As is apparent from all Figures, blocking device 41 is arranged on upper wall 40 of cover 35 of pivot housing 8. This blocking device is preferably designed as hood-like cover 41 and is mounted so that it can pivot in a limited manner about pivot shaft 42.

Hood-like cover 41 comprises laterally projecting cover flange 43 which covers the release position (FS) on connecting link 44 for conduit-plate adapter locking device 34 in the closed state of hood-like cover 41 (see FIGS. 3–6).

Locking device 34 for the conduit-plate adapter can be moved along connecting link 44 between a release position (FS) at one end of connecting link and a locking position (AS) at another end of connecting link. The locking device is formed as bar spring 34, which, when positioned in the locking position (AS), loads central shoulder 33 of conduit-plate adapter 12 in direction (R) (see FIG. 3).

The operation of the device of the present invention may thus be understood. If conduit-plate adapters 12 of spinning devices 1 are to be replaced in an open-end rotor spinning machine, e.g. as a part of performing a batch change, one of the spinning locations concerned is first stopped by pivoting pivot housing 8 about pivot axis 16 in the direction of arrow S (FIG. 2). When pivot housing 8 is outward away from the rotor housing, both spinning rotor 2 and opening cylinder 21 are automatically decoupled from their drives and braked to a standstill in this spinning device.

Subsequently, hood-like cover 41 of the blocking device is transferred out of operating position BS shown in FIGS. 1, 2, 3 and 5 into opening position ÖS (FIG. 6) in which locking device 34 for conduit-plate adapter 12 is readily accessible for the operating personnel. The locking device, in the form of bar spring 34, is thrust along connecting link 44 out of locking position AS into release position FS and snaps into place thereat. When bar spring 44 is positioned in this release position FS, central shoulder 33 of conduit-plate adapter 12 is also freed so that conduit-plate adapter 12 can be removed to the front out of its recess 31, as is indicated in particular in FIG. 4.

A new adapter can subsequently be inserted into the recess 31 in reverse order. After the insertion of the new conduit-plate adapter 12 into recess 31, bar spring 34 is brought out of its release position FS into locking position AS to engage behind central shoulder 33 of conduit-plate adapter 12 and thus loads the conduit-plate adapter in the direction of arrow R. Conduit-plate adapter 12 is fixed reliably in its recess 31 in this manner. Hood-like cover 41 is then pivoted inwardly into its operating position BS and the spinning box is returned into a state ready for operation by closing pivot housing.

If conduit-plate adapter 12 should not be secured according to instructions, e.g. because it was forgotten to transfer bar spring 34 out of its release position FS into its locking position AS, it is not possible to return hood-like cover 41 into its operating position BS in which hood-like cover 41 lies flat on upper wall 40 of cover 35. Specifically, if bar spring 34 is still in its release position FS laterally projecting cover flange 43 of hood-like cover 41 comes to rest upon bar spring 34, which can be clearly recognized by the operating personnel.

It will therefore be readily understood by those persons skilled in the art that the present invention is susceptible of broad utility and application. Many embodiments and adaptations of the present invention other than those herein described, as well as many variations, modifications, and equivalent arrangements will be apparent from or reasonably suggested by the present invention and the foregoing description thereof, without departing from the substance or scope of the present. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalents arrangements, the present invention being limited only by the claims appended hereto and the equivalents thereof.

What is claimed is:

1. An open-end spinning device comprising vacuum-loaded rotor housing, a spinning rotor rotatably supported in the housing, a conduit plate for closing the housing, the conduit plate defining a receptacle, a replaceable conduit-plate adapter mounted in the receptacle, a locking device for fixing the conduit-plate adapter within the receptacle, and a blocking device associated with the locking device for movement into an operating position only when the locking device is in a locking position fixing the conduit-plate adapter.

2. The open-end spinning device according to claim 1, wherein the locking device comprises a spring element adjustably movable between a locking position and a release position.

3. The open-end spinning device according to claim 2, wherein the blocking device comprises a movably mounted hood-like cover comprising a blocking element for covering the release position of the locking device upon the closing of the blocking device.

4. The open-end spinning device according to claim 3, wherein the hood-like cover is mounted to pivot in a limited manner about a pivot shaft.

5. The open-end spinning device according to claim 3, wherein the hood-like cover comprises a laterally projecting cover flange forming the blocking element.

6. The open-end spinning device according to claim 1, wherein the locking device comprises a bar rod guided on a connecting link.

7. The open-end spinning device according to claim 1, wherein the conduit-plate adapter comprises a central shoulder engagable by the locking device to be urged into the receptacle when the locking device is in its locking position.

* * * * *